Oct. 30, 1928.                                                   1,690,003
J. W. FOERCH, JR
METHOD OF MAKING FILLERS FOR BAKING PANS
Filed Sept. 2, 1926
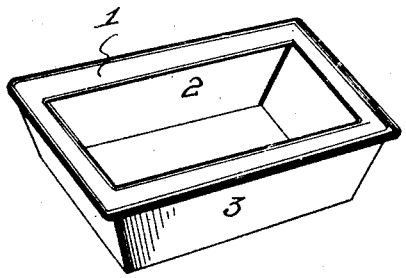
Fig. 1
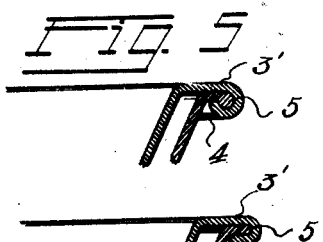
Fig. 5
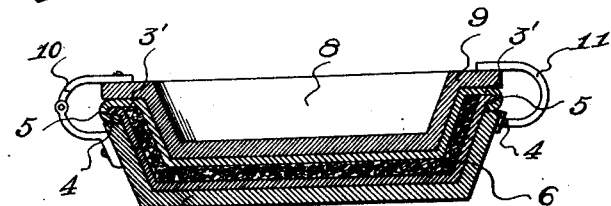
Fig. 2
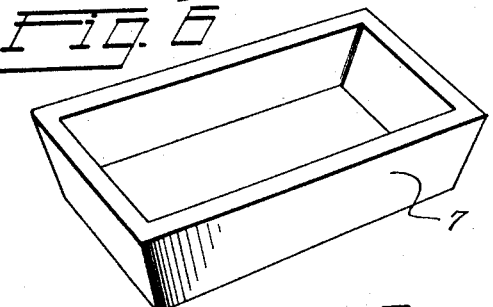
Fig. 6
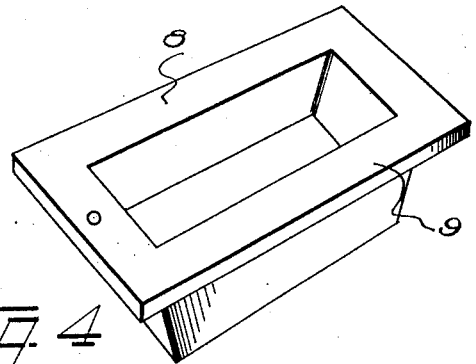
Fig. 3
Fig. 4
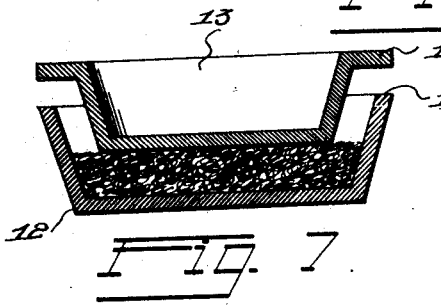
Fig. 7
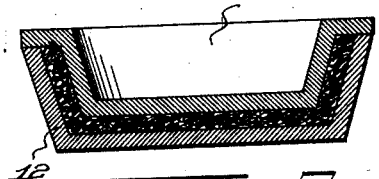
Fig. 8
Inventor
John W. Foerch Jr.
By  Max A. Johnson
                    Attorney Patented Oct. 30, 1928.

1,690,003

UNITED STATES PATENT OFFICE.

JOHN W. FOERCH, JR., OF WILKES-BARRE, PENNSYLVANIA.

METHOD OF MAKING FILLERS FOR BAKING PANS.

Application filed September 2, 1926. Serial No. 133,207.

This invention relates to a cooking receptacle, and method of making the same, and so far as the method is concerned is particularly applicable to making the baking pan shown and described in my application, Serial No. 87,265, filed February 10, 1926.

The object of the invention, primarily, is to provide a cheap, expeditious, and efficent way of making a utensil designed to prevent burning of the contents, and to do away with the necessity of having to employ, in the bottom of the pan, greased paper or other material, sometimes interposed between the inner surface of a baking pan and its contents.

In the application referred to, there is disclosed a baking pan comprising a body formed with inner and outer walls, suitably spaced apart (constituting the bottom, ends, and sides of the finished receptacle) and having a filling of asbestos, or other fire-proof material between the walls, the edges of the walls at their ends and sides, at the top of the pan, being securely united.

It is important that the filler be in close contact with the walls of the receptacle, and that every crevice and space therebetween be filled in order to accomplish in the most efficient manner, a baking operation in which the contents of the pan is unformly cooked. To this end the method about to be described contemplates forming the asbestos filling, in suitable molds, whereby it is shaped, substantially, in the exact shape of the space between the walls of the pan, and while the filler is moist, but sufficiently set to handle, it is inserted in the bottom section of the pan, which section is meantime held in rigid position, and the inner section of the pan forced down on the filler, and the edges of the pan crimped securely together.

The introduction of the filler between the pan sections, and applying sufficient force to make the filler conform exactly to the space between the pan sections, is apt to cause the said sections to bulge or get out of shape. I, therefore, employ forms, whose surfaces are in intimate contact with the outside and inside of the walls of the pan. The space between the outer and inner forms is exactly the shape of the main body of the receptacle or pan, when in finished shape. Means are preferably provided for maintaining the inner and outer forms in properly spaced relation. Especially is it important to provide against the movement of the inner form in the operation of forcing it down upon the inner section of the pan, as it is through the inner section of the pan that the force is communicated to the filler, which as intimated, has been previously shaped and substantially dried before it is introduced between the inner and outer sections of the pan body.

In the drawings illustrating the invention.

Figure 1 is a perspective view of a pan constructed in accordance with my invention, and for which the present method is adapted for making.

Figure 2 is a cross section of a pan impressed between the shape-retaining forms.

Figure 3 is a perspective view of the outer form.

Figure 4 is a similar view of the inner form, or the form adapted to hold in place the inner section of the pan after the previously shaped filler has been placed in the bottom pan section.

Figure 5 is an enlarged detailed sectional view, showing the manner of securing the edges of the pan sections together.

Figure 6 is a section showing another manner in which the edges of the pan sections may be secured together.

Figure 7 is a cross section of a filler-shaping mold, with the filler therein, previous to shaping.

Figure 8 is a similar view showing the sections of the mold in their most intimate relation, wherein the filler has been flowed and caused to take the shape, substantially, of the space between the pan sections.

The numeral 1 designates a baking pan formed in the main, of inner walls 2 and outer walls 3. The inner section is provided with a continuous flange 3', and the lower section is provided with a shorter flange 4, the two flanges at their outer edges being crimped together as indicated at 5, thus securely fastening the two edges together. The pan thus formed comprises a hollow body with the walls suitably spaced apart, the space between the walls being for the purpose of receiving the filler of asbestos or other fireproof material 6. This filler is shaped to conform to the outer formation of the outer section of the pan, and is adapted to be received in said pan section with a close fit at all points.

The numeral 8 designates the inner shape-retaining form. This is shaped so as to fit snugly all parts of the inner section of the pan, and is provided with a flange 9, of a width sufficient to overlap that portion of the upper edge of the pan, inside of the point of which the inner and outer sections are crimped together, the flange 9, serving to force the edges of the pan sections, adjacent the seams, into close contact with each other, so as to facilitate the final or crimping operation, by which the two pan sections are secured together.

Preferably I secure the outer and inner forms together by means of a hinge 10. At the opposite end of the outer form I preferably provide a clamp 11, adapted to be rocked over on the flange of the inner form to keep the two forms in properly spaced relation, and in close contact with the inner and outer walls of the pan. This hinge, and the clamping device, occupy very little space, and are preferably located at the ends of the forms, thus enabling the crimping and fastening of the pan sections, at the side of the pan, before removing it from the forms. The operation of securing the pan sections together at their ends may be performed after the pan has been removed from the forms.

The numeral 12 designates the outer section of the filler-shaping mold, and 13, the inner section thereof. The outer section is partially filled with asbestos or other fireproof material, in plastic state, and the inner section 13 is forced down upon it until the flange 14 of the inner section, rests upon the upper edge 15, of the outer section, thereby forcing the plastic material to completely fill the space between the two mold sections, thus shaping the material into a shape corresponding, substantially, to the shape of the space between the inner and outer pan sections.

The filler, shaped as described, is placed in the outer pan section, which as has been explained, is supported on all sides by the walls of the form 7, the inner section of the pan is forced down upon it, by the form 8, causing the filler to take the exact shape and be forced into intimate contact at all points with the interior walls of the inner and outer pan sections. When these pan sections are in their most intimate relation and their edge flanges in close contact, the crimping or securing operation is performed, thus producing the complete article.

I claim:

1. That method of constructing a baking pan which consists in providing inner and outer pan wall members, preforming a block of insulating material to a form suitable to fit between said members, and assembling the members on the insulating block and applying pressure to said members to cause the same to engage the insulating block uniformly throughout the inner and outer surfaces of said block.

2. That method of constructing a baking pan which consists in providing inner and outer pan wall members, preforming a block of insulating material to a form suitable to fit between said members, assembling the members on the insulating block and applying pressure to said members to cause the same to engage the insulating block uniformly throughout the inner and outer surfaces of said block, and uniting the edges of said members to hold the same in engaged position.

In testimony whereof he has affixed his signature.

JOHN W. FOERCH, Jr.